United States Patent
Kase et al.

(10) Patent No.: US 9,570,917 B2
(45) Date of Patent: Feb. 14, 2017

(54) LIGHT EMITTING ELEMENT DRIVE CIRCUIT

(71) Applicant: FUJITSU LIMITED, Kawasaki-shi, Kanagawa (JP)

(72) Inventors: Mariko Kase, Isehara (JP); Satoshi Ide, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 705 days.

(21) Appl. No.: 14/023,814

(22) Filed: Sep. 11, 2013

(65) Prior Publication Data

US 2014/0103719 A1  Apr. 17, 2014

(30) Foreign Application Priority Data

Oct. 11, 2012 (JP) ................. 2012-226062

(51) Int. Cl.
*H01S 5/026* (2006.01)
*H02J 4/00* (2006.01)
*H05B 33/08* (2006.01)

(52) U.S. Cl.
CPC ............ *H02J 4/00* (2013.01); *H05B 33/0812* (2013.01); *Y02B 20/345* (2013.01); *Y10T 307/406* (2015.04)

(58) Field of Classification Search
CPC ........ H01S 5/026; H01S 5/0261; H01S 5/042; H01S 5/0427; H01S 5/183
See application file for complete search history.

(56) References Cited

U.S. PATENT DOCUMENTS

2010/0052790 A1  3/2010  Tsunoda
2012/0062143 A1  3/2012  Sugawara

FOREIGN PATENT DOCUMENTS

JP  2010-56918   3/2010
JP  2012-080061  4/2012

*Primary Examiner* — Armando Rodriguez
(74) *Attorney, Agent, or Firm* — Staas & Halsey LLP

(57) ABSTRACT

A drive circuit that drives a light emitting element coupled to a first output terminal of a differential circuit, the drive circuit includes: a dummy load provided at a second output terminal of the differential circuit, a resistor coupled between the first output terminal and the second output terminal, two transistors coupled to a voltage source and applying a current to the light emitting element and the dummy load, and a comparative amplifying circuit having a non-inverting input terminal coupled to a reference voltage, an inverting input terminal coupled to at least the first output terminal of the differential circuit via a resistor, and an output terminal coupled to gates of the two transistors.

9 Claims, 16 Drawing Sheets

LIGHT EMITTING ELEMENT DRIVE CIRCUIT

CROSS-REFERENCE TO RELATED APPLICATION

This application is based upon and claims the benefit of priority from the prior Japanese Patent Application No. 2012-226062 filed on Oct. 11, 2012, the entire contents of which are incorporated herein by reference.

FIELD

The embodiments discussed herein are related to a light emitting element drive circuit.

BACKGROUND

Recently, the development of optical interconnecting techniques using light for short-range communication such as between backplanes, has come under close attention accompanying capacity enlargements and improvements in transfer speeds in supercomputers and servers. A vertical cavity surface emitting laser (VCSEL) diode that allows direct modulation while being compact and exhibiting reduced power consumption is used, for example, as a light emitting element in an optical modulator for optical interconnection.

FIG. 1 illustrates a conventional circuit for high-speed direct modulation of a VCSEL.

Normally in an analog circuit, signal transferring is conducted through a differential amplifier circuit as a noise countermeasure. As a result, in the light emitting element drive circuit in FIG. 1, differential drive signals are applied to terminals in and inx and a differential output appears at terminals out and outx. A VCSEL 12 is coupled to the terminal out, and a dummy load 11 having similar impedance characteristics as the VCSEL 12 is coupled to the terminal outx. Furthermore, current sources 10-1 and 10-2 for applying a bias current to the VCSEL 12 and the dummy load 11, are respectively coupled to the terminals out and outx.

The conditions expected in a light emitting element drive circuit for realizing high-speed modulation are, firstly, the ability to perform impedance matching for controlling the reflection of signals and, secondly, the ability to generate a large bias current for driving the VCSEL.

While the conventional example illustrated in FIG. 1 is a configuration that meets these two conditions, there is a problem that the bandwidth deteriorates due to parasitic capacitance of the transistor since the size of a transistor to configure the current sources 10 is preferably large in order to generate the large bias current that is the second condition.

FIGS. 2A and 2B are diagrams for explaining a conventional current source.

FIG. 2A illustrates a current source of the conventional structure. This structure is a so-called current mirror configuration, and as illustrated by the dotted line in FIG. 2B, the structure uses a saturation region (a region in which the current flowing to the drain ideally does not change with respect the drain voltage, but actually has a slope as illustrated in FIG. 2B) of a transistor Tr1. As a result, a stable current supply can be achieved without relying on the power source voltage.

As illustrated in FIG. 2A, the value of a current I1 is derived by multiplying the size ratio between transistors Tr0 and Tr1 by a current I0. Moreover, a drain voltage Vds1 of the transistor Tr1 expressed by the characteristics of the transistor in FIG. 2B is desirably larger than a voltage Vds_sat having a saturated current value and expressed by the transistor characteristics in FIG. 2B, and is desirably smaller than the difference between the voltage Vout for driving the VCSEL 12 and a power source voltage VDD.

However, when an adequate current I1$r$ for driving the VCSEL 12 is sought, the bandwidth deteriorates due to the effect of the parasitic capacitance since the transistor size of the transistor Tr1 is desirably increased in order to increase the saturation current.

Japanese Patent Laid-open No. 2010-56918 describes an amplifying circuit that is used as a driver for an optical modulator, is normally operated in an amplifier output stage, and is able to supply an output level drive signal corresponding to a modulator.

SUMMARY

According to an aspect of the embodiment, a drive circuit that drives a light emitting element coupled to a first output terminal of a differential circuit, the drive circuit includes: a dummy load provided at a second output terminal of the differential circuit, a resistor coupled between the first output terminal and the second output terminal, two transistors coupled to a voltage source and applying a current to the light emitting element and the dummy load, and a comparative amplifying circuit having a non-inverting input terminal coupled to a reference voltage, an inverting input terminal coupled to at least the first output terminal of the differential circuit via a resistor, and an output terminal coupled to gates of the two transistors.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
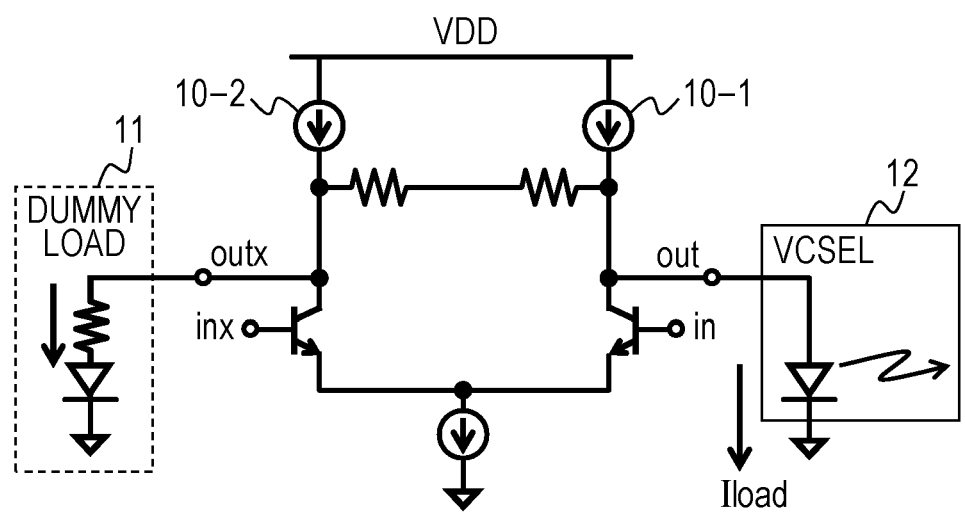
FIG. 1 illustrates a conventional circuit for high-speed direct modulation of a VCSEL.
Figure 2B:
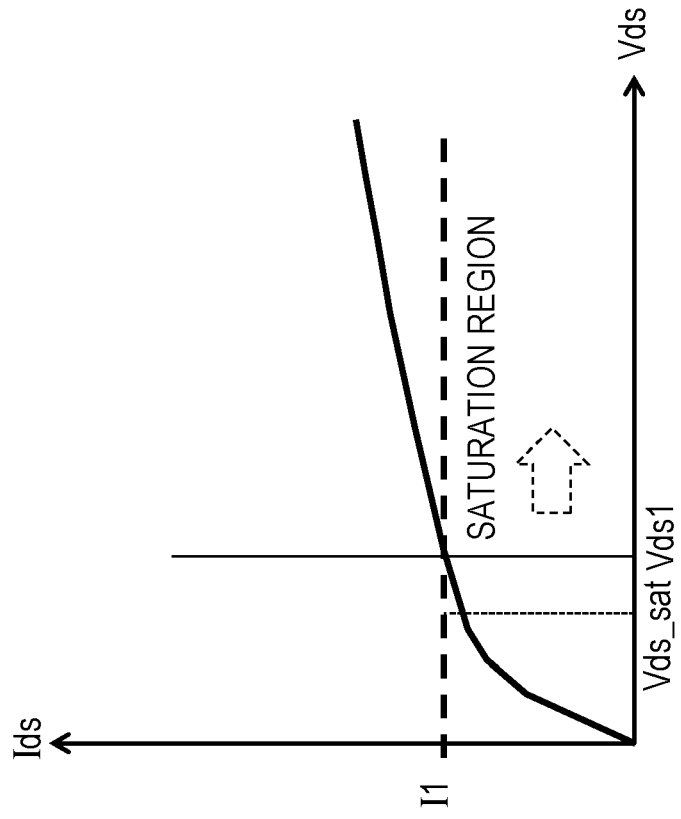
FIGS. 2A and 2B illustrate a conventional current source.
Figure 2A:
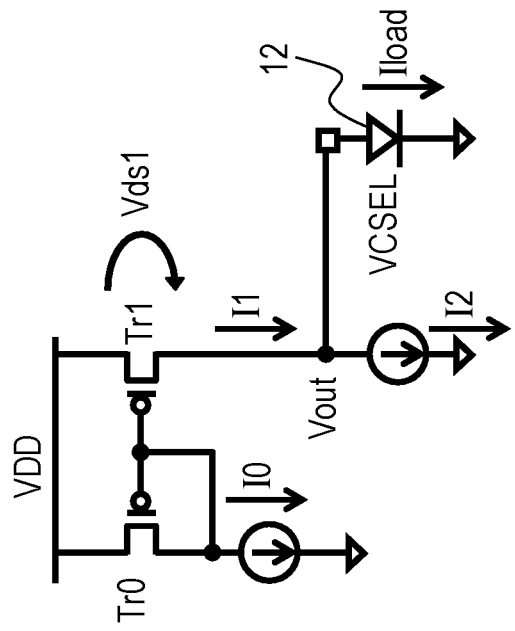
Figure 3A:
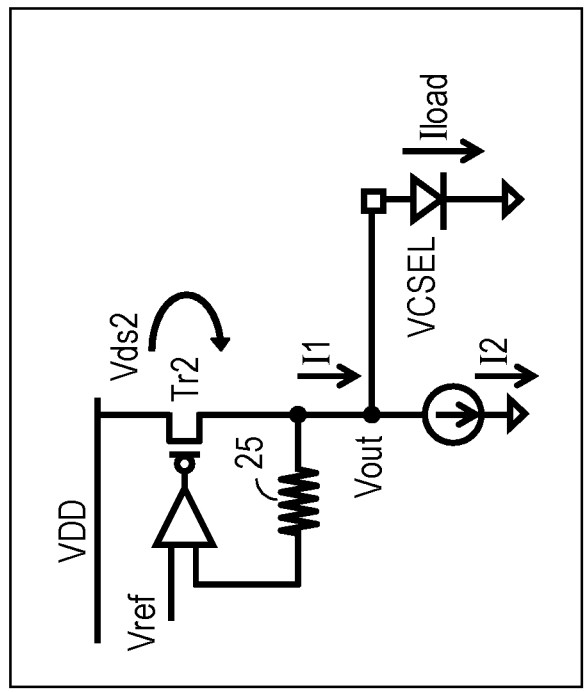
FIGS. 3A and 3B are first diagrams for explaining a first embodiment.

FIGS. 3A to 5 are diagrams for explaining a first embodiment. A current source for supplying a current I1 in FIG. 3A is configured with a transistor and a comparative amplifying circuit and applies feedback to cause the voltage Vout to converge on the value of a reference voltage Vref. The configuration of the dummy load side is omitted in FIG. 3A. Since a current Iload applied by the VCSEL IV characteristics is determined if the voltage Vout value is determined, the IV characteristics of the VCSEL to be connected are known in order to determine the reference voltage Vref.

Figure 3B:
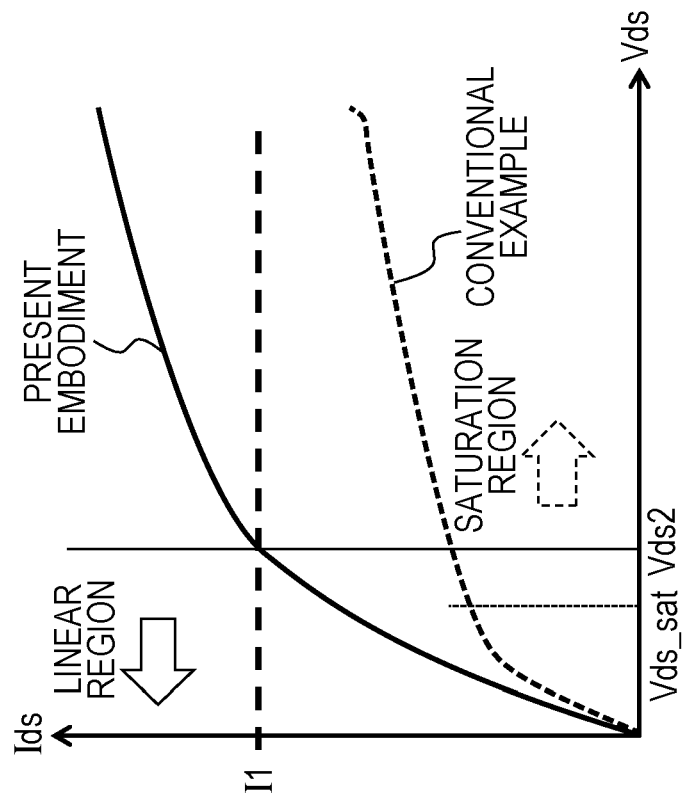

The linear region of the transistor Tr2 is used for the light emitting element drive circuit of the present embodiment. Since the slope of the linear region of the transistor IV characteristics is controlled by controlling the gate voltage of the transistor Tr2, a current value larger than that of the conventional technique may be obtained with the same drain voltage even if a transistor is used that is smaller than the transistor Tr1 used in the conventional current mirror. The dotted line in FIG. 3B represents the characteristics of a conventional current mirror current source, and the solid line represents an example of the present embodiment. The transistor Tr2 is only half the size of the transistor Tr1 of the conventional current mirror current source. The current I1 that is larger than the conventional current may be supplied to the circuit with the same drain voltage Vds2.

Figure 4:
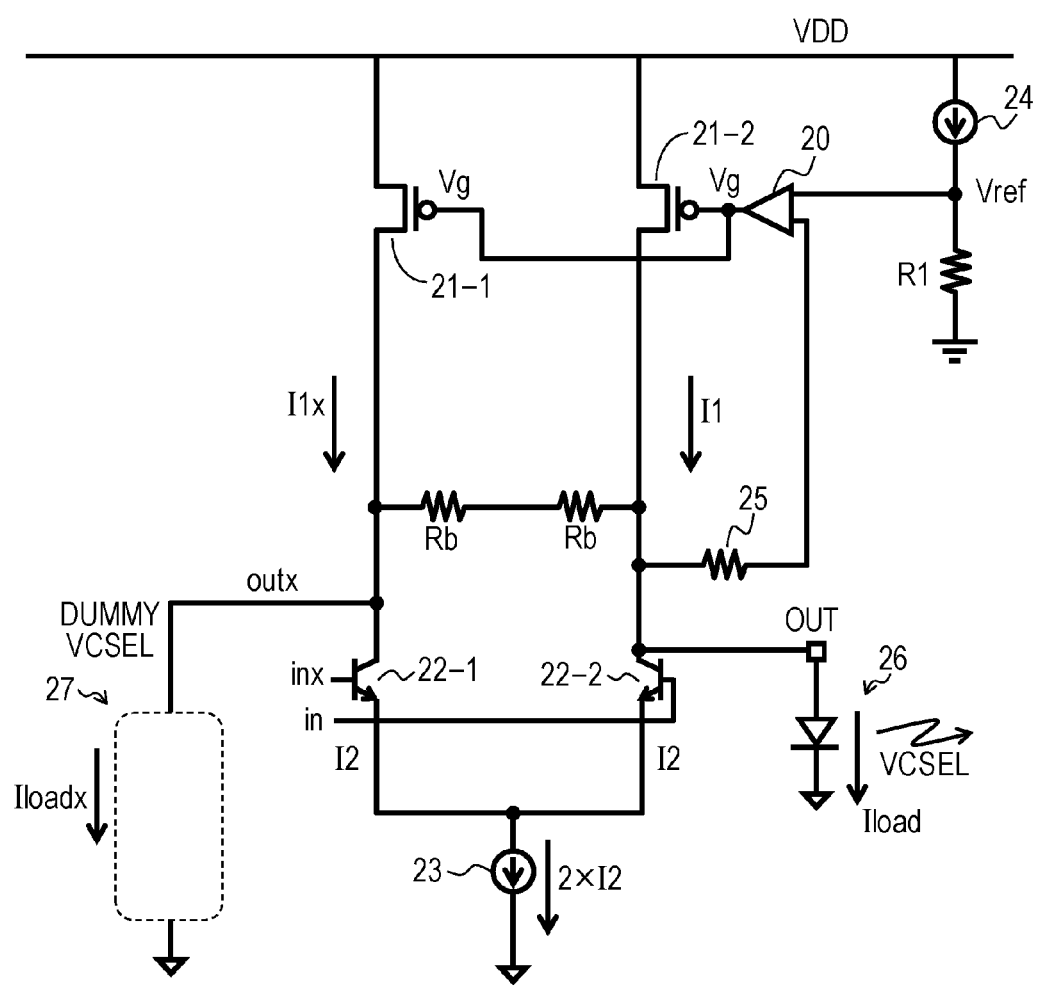
FIG. 4 is a second diagram for explaining the first embodiment.

FIG. 4 is a circuit diagram of the light emitting element drive circuit of the first embodiment.

Differential input signals Vin and Vinx are applied to the bases of transistors 22-2 and 22-1. Emitter currents I2 of the transistors 22-1 and 22-2 both have the same values when there is no signal, and a current source 23 supplies two I2 currents. The reference voltage Vref that is a voltage inverted by a resistor R1 from a current from the current source 24 at a non-inverting input terminal, and the voltage Vout at an inverting input terminal are inputted to the comparative amplifying circuit 20 using a non-inverting amplifying circuit. An output Vg of the comparative amplifying circuit 20 is coupled to the gates of the transistors 21-1 and 21-2. The output voltages Vout and Voutx have the same voltage in this case.

Figure 5:
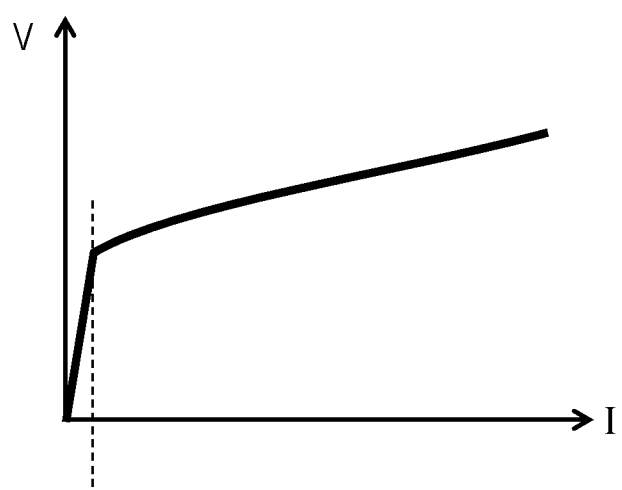
FIG. 5 is a third diagram for explaining the first embodiment.

A VCSEL 26 has known IV characteristics as illustrated in FIG. 5. A desired voltage for obtaining a desired drive current of the VCSEL 26 is derived from these characteristics, and the value is set as the value of the voltage Vref. A negative feedback circuit including the comparative amplifying circuit 20, the transistor 21-2 or 21-1, and a resistor 25 adjusts the gate electric potential Vg of the transistor 21-2 to become the output voltage Vout from which the desired VCSEL current is obtained by appropriately setting the reference voltage Vref to the comparative amplifying circuit. A current Iloadx matching a voltage Voutx is applied to a dummy load 27.

Figure 6:
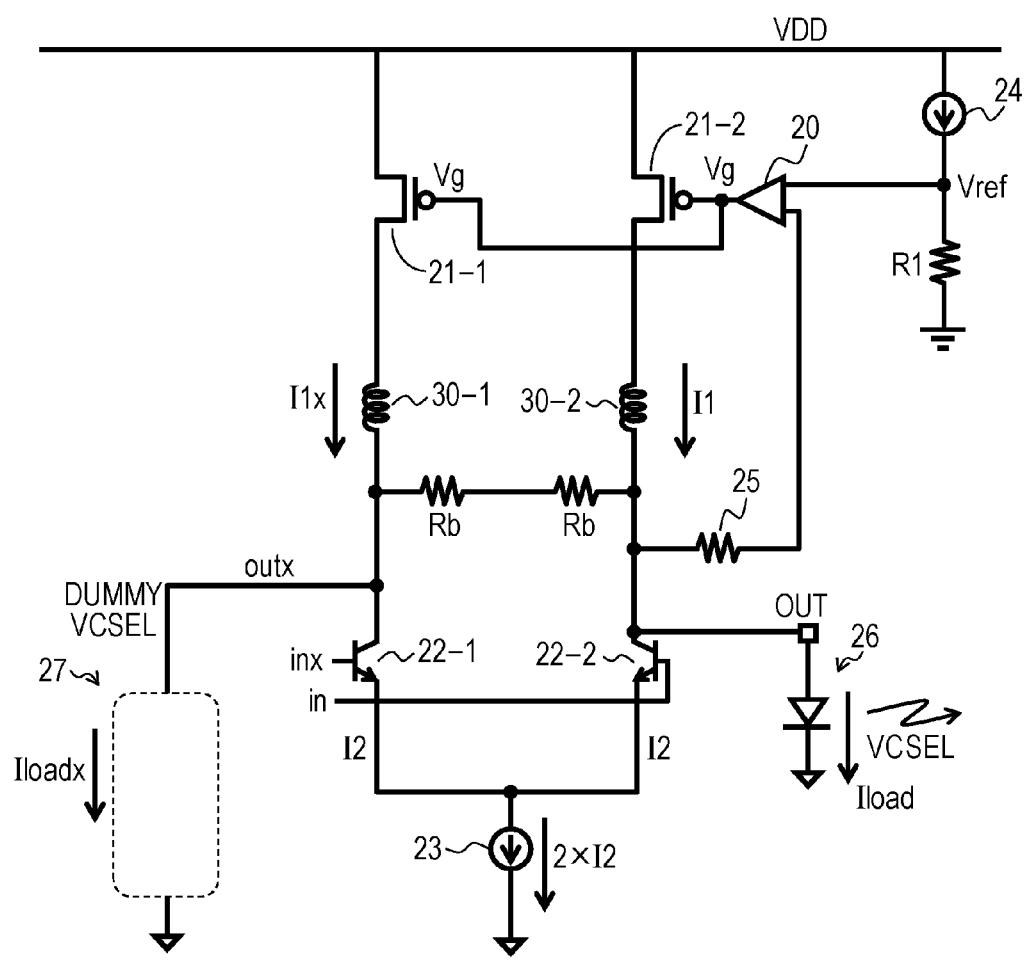
FIG. 6 is a first diagram for explaining a second embodiment.
Figure 7A:
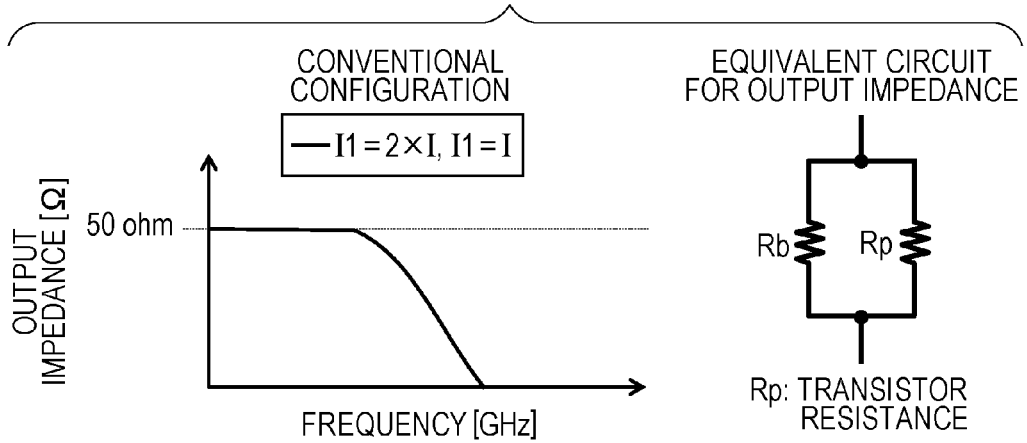
FIGS. 7A, 7B and 7C are second diagrams for explaining the second embodiment.
Figure 7B:
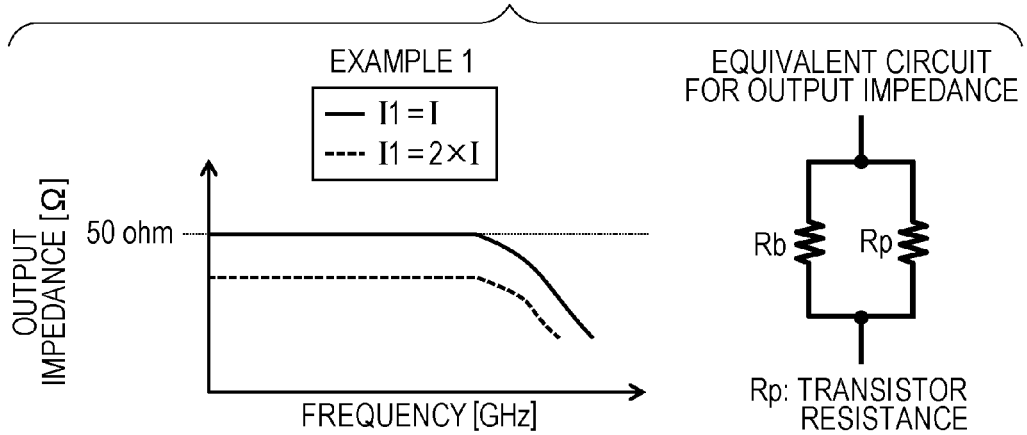
Figure 7C:
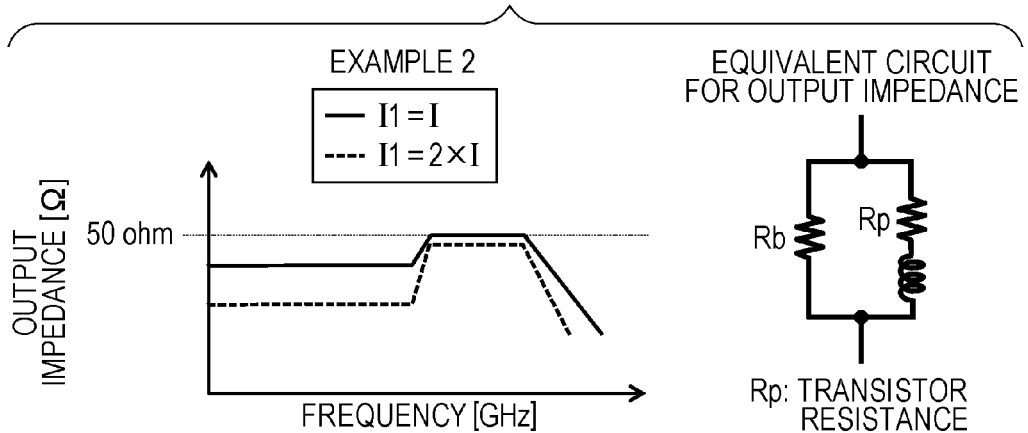

FIGS. 6 to 7C are diagrams for explaining a second embodiment. In FIG. 6, the same constituent elements as in FIG. 4 are assigned the same reference numerals and thus descriptions thereof are omitted.

Inductors (for example, coils) 30-1 and 30-2 are respectively provided at the drain side of the transistors 21-1 and 21-2 in the second embodiment illustrated in FIG. 6.

FIGS. 7A to 7C illustrate schematic views of frequency characteristics of output impedances.

A resistor Rp (the slopes in the saturated regions of the IV characteristics) of the current source configured by the transistors Tr0 and Tr1 is ideally unlimited and the output impedance is determined by the resistor Rb and does not change since the applied current is used in the saturated region of the transistor even if the current is changed as illustrated in FIG. 7A according to the conventional technique. An output impedance of 50 Ω is suitable in this case.

However, looking at FIG. 7B corresponding to the first embodiment, the resistor Rp of the transistors 21-1 and 21-2 changes (since the linear region of the transistors is used) when the current value is changed even if the resistor Rb is set so that the output impedance becomes an arbitrary value. As a result, there is a possibility that impedance matching which is one of the conditions expected in the light emitting element drive circuit may not be realized.

Inductors (for example, coils) 30-1 and 30-2 are respectively inserted between the drain and the output terminals of the transistors 21-1 and 21-2 as illustrated in FIG. 6. Consequently, as illustrated in FIG. 7C, the impedances of the inductors increase and mask the resistor Rp of the transistors in high frequencies (region to be actually used). As a result, the output impedance may be determined with the resistor Rb and impedance matching may be maintained even if the current is changed.

Figure 8:
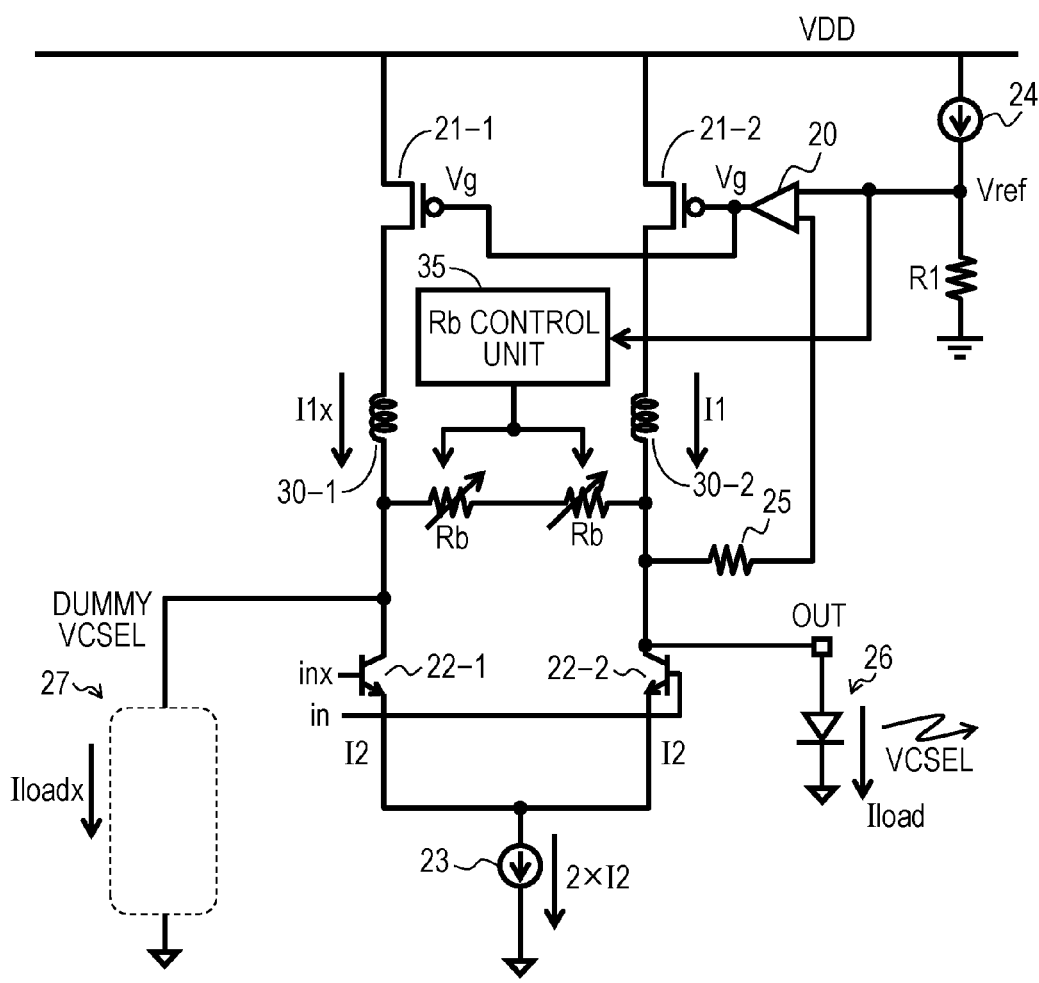
FIG. 8 is a first diagram for explaining a third embodiment.
Figure 9:
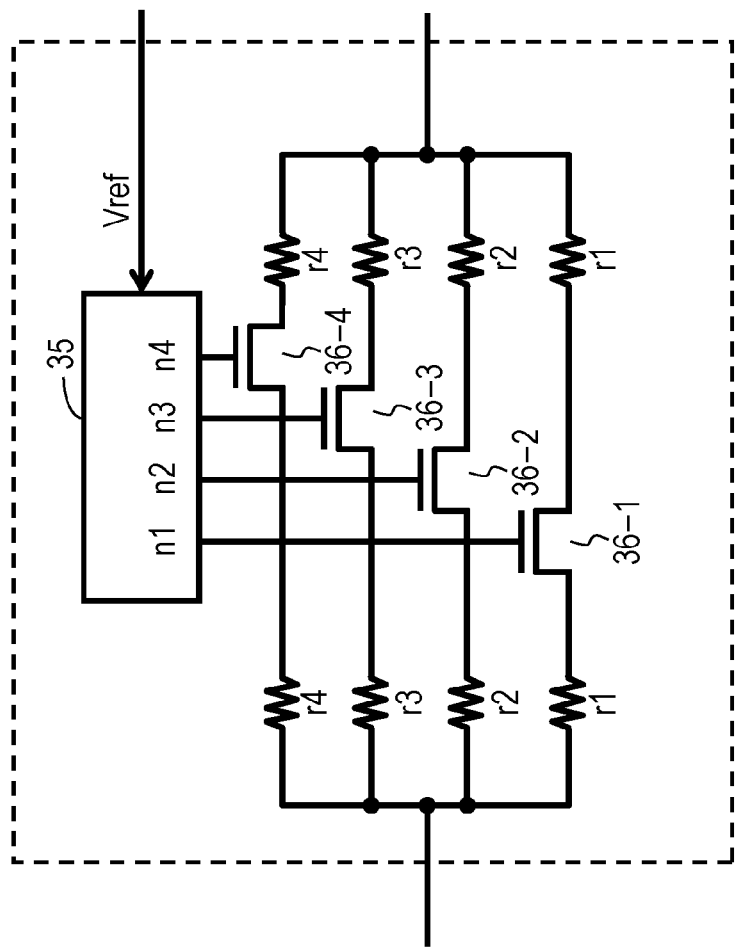
FIGS. 9A and 9B are second diagrams for explaining the third embodiment.

FIGS. 8 and 9B are diagrams for explaining a third embodiment. In FIG. 8, the same constituent elements as in FIG. 6 are assigned the same reference numerals and thus descriptions thereof are omitted.

In FIG. 8, the resistor Rb is controlled for adjustment when drain currents I1 and I1$x$ of the transistors 21-1 and 21-2 are changed, that is, when the reference voltage Vref is changed. Specifically, an Rb control unit 35 that makes the resistor Rb variable detects the reference voltage Vref and controls the resistance value of the resistor Rb. The Rb control unit 35 changes the value of the resistor Rb and adjusts the output impedance when the value of the current flowing through the transistors 21-1 and 21-2 is changed.

FIGS. 9A and 9B are diagrams for explaining in detail portions of the Rb control unit and the resistor Rb illustrated in FIG. 8.

As described in FIG. 9A, a plurality of resistors r1 to r4 are provided to configure the variable resistor Rb, and are selected and used by transistors 36-1 to 36-4. The Rb control unit 35 includes a control table, for example, as illustrated in FIG. 9B. The control table is a table for registering predetermined Rb control signals in accordance with values of the reference voltage Vref. The Rb control signals are signals for selecting the resistors r1 to r4 illustrated in FIG. 9A. The Rb control unit 35 refers to the control table to obtain the Rb control signal when the reference voltage Vref is detected. The resistors r1 to r4 are then selected by applying the Rb control signals to the transistors 36-1, 36-2, 36-3, and 36-4.

Figure 10:
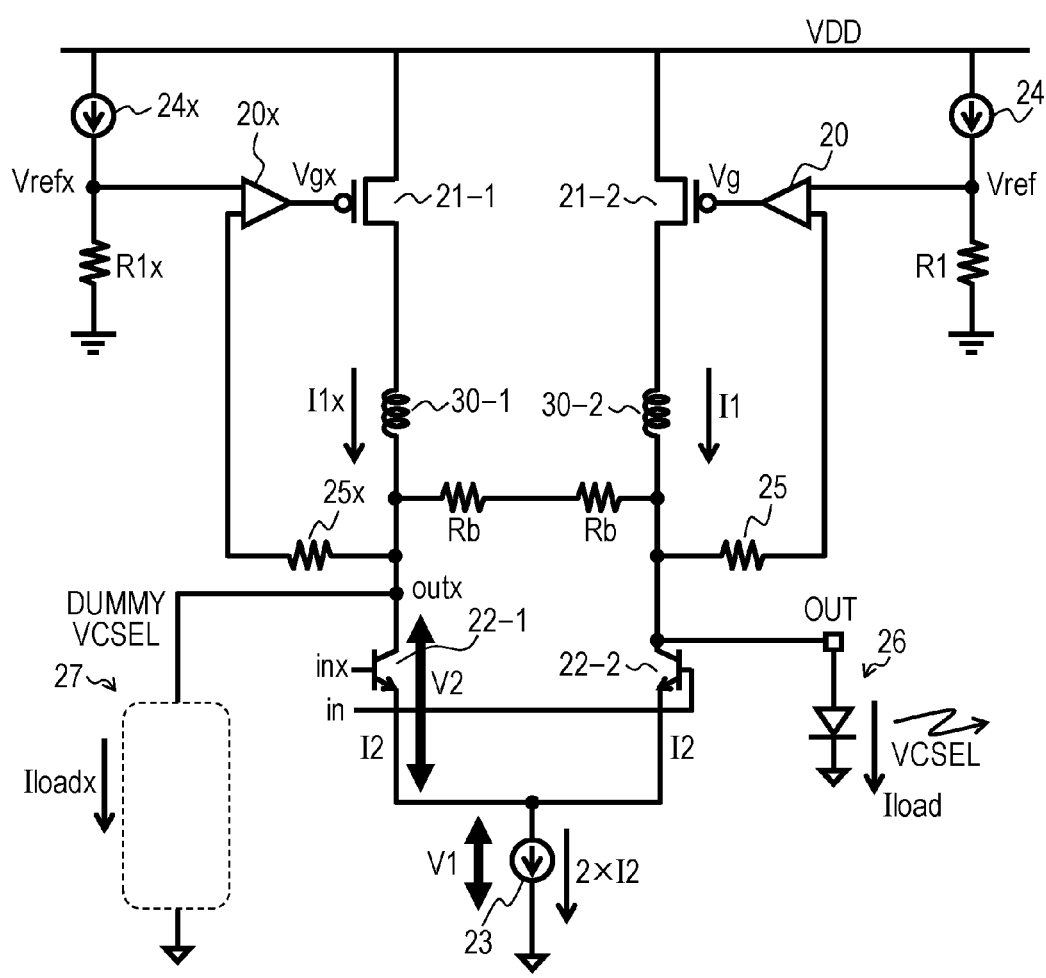
FIG. 10 is a first diagram for explaining a fourth embodiment.
Figure 11:
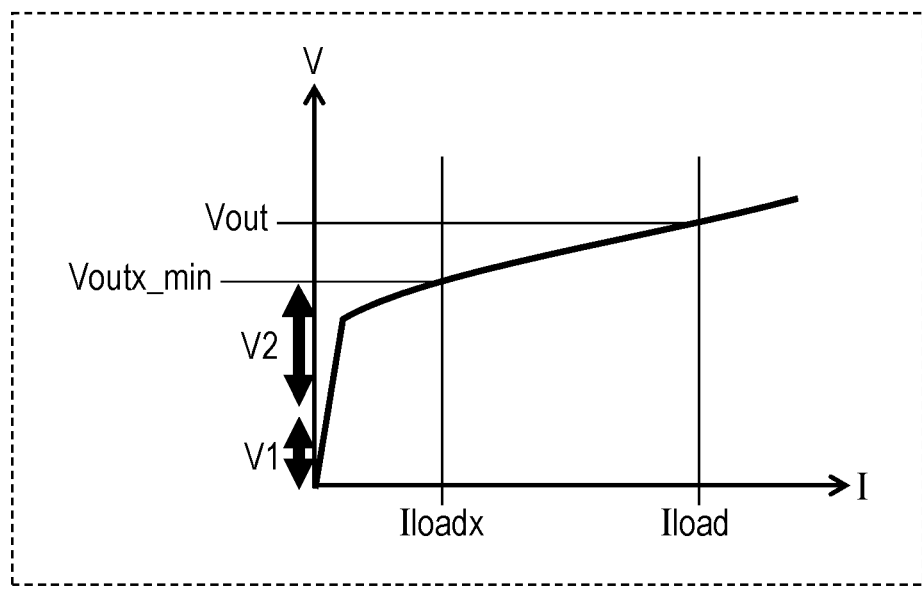
FIG. 11 is a second diagram for explaining the fourth embodiment.

FIGS. 10 and 11 are diagrams for explaining a fourth embodiment. In FIG. 10, the same constituent elements as in FIG. 6 are assigned the same reference numerals and thus descriptions thereof are omitted.

While the same controls are performed for the positive side (VCSEL 26 side) and the negative side (dummy load 27 side) up to this point, the positive phase and the negative phase may be controlled separately as illustrated in FIG. 10. Specifically, a current source 24$x$, a resistor R1$x$, a comparative amplifying circuit 20$x$, and a resistor 25$x$ are provided, and a gate voltage Vgx to the transistor 21-1 is controlled by negative feedback using the reference voltage Vrefx. In this configuration, the inverse phase reference voltage Vrefx is made to be the minimum value Voutx_min for operating the circuit. This value becomes the sum of a minimum desirable value V1 for driving the current source 23 and a minimum value V2 for operating the input transistor 22-1 of the differential pair. By doing so, control of the current Iloadx flowing to the dummy load is possible which leads to a reduction in power consumption.

Figure 12:
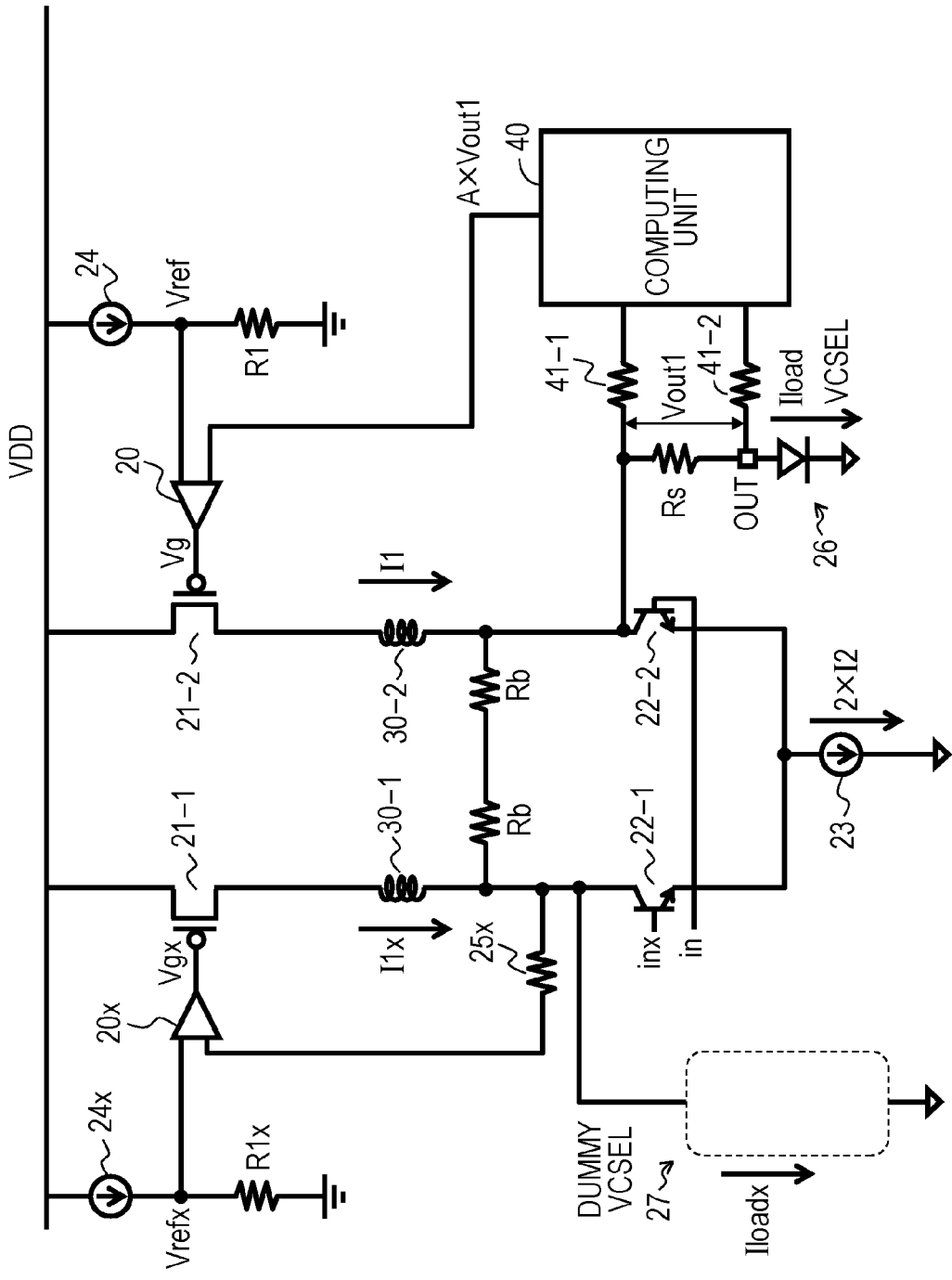
FIG. 12 is a first diagram for explaining a fifth embodiment.
Figure 13:
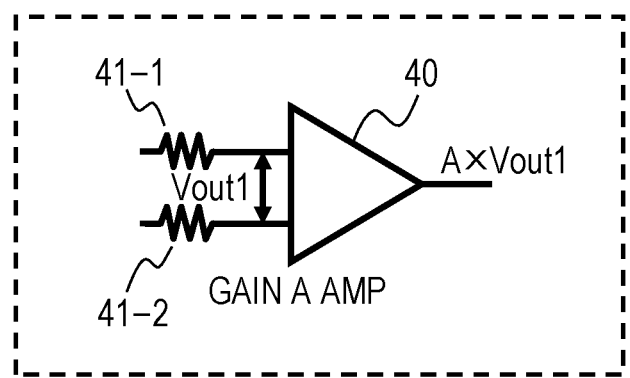
FIG. 13 is a second diagram for explaining the fifth embodiment.

FIGS. 12 and 13 are diagrams for explaining a fifth embodiment. In FIG. 12, the same constituent elements as in FIG. 10 are assigned the same reference numerals and thus descriptions thereof are omitted.

While a method of controlling the output voltage has been discussed in embodiments 1 to 4 under the assumption that the IV characteristics of the coupled load (VCSEL) is known, the current value may be controlled as discussed in the fifth embodiment. In this case, a monitor resistor Rs is inserted in series with the load (VCSEL 26) and the current value is derived by monitoring the voltages at both ends of the monitor resistor Rs.

The voltages at both ends of the monitor resistor Rs are inputted into a computing unit 40 through respective input resistors 41-1 and 41-2. The computing unit 40 multiplies a certain constant A by the voltages Vout1 at both ends of the monitor resistor Rs, and inputs the result into the comparative amplifying circuit 20.

FIG. 13 is a configuration example of the computing unit 40. The computing unit 40 is a gain A amplifier and receives the voltage Vout1 and outputs a voltage A×Vout1.

The reference voltage Vref is expressed as described below using the resistor R1 and a current Iref of the current source 24.

$$Vref = R1 \times Iref$$

Conversely, the voltage Vout1 is expressed as described below using the monitor resistor Rs and the current Iload flowing to the VCSEL.

$$A \times Vout1 = A \times Rs \times Iload$$

Since convergence is carried out so that A×Vout1=Vref due to the negative feedback, the formula Iref=A×Iload×Rs/R1 is derived from the above formulas. Therefore, the resistors R1 or Iref may be set to satisfy the above formula when a desired current Iload is present.

Figure 14:
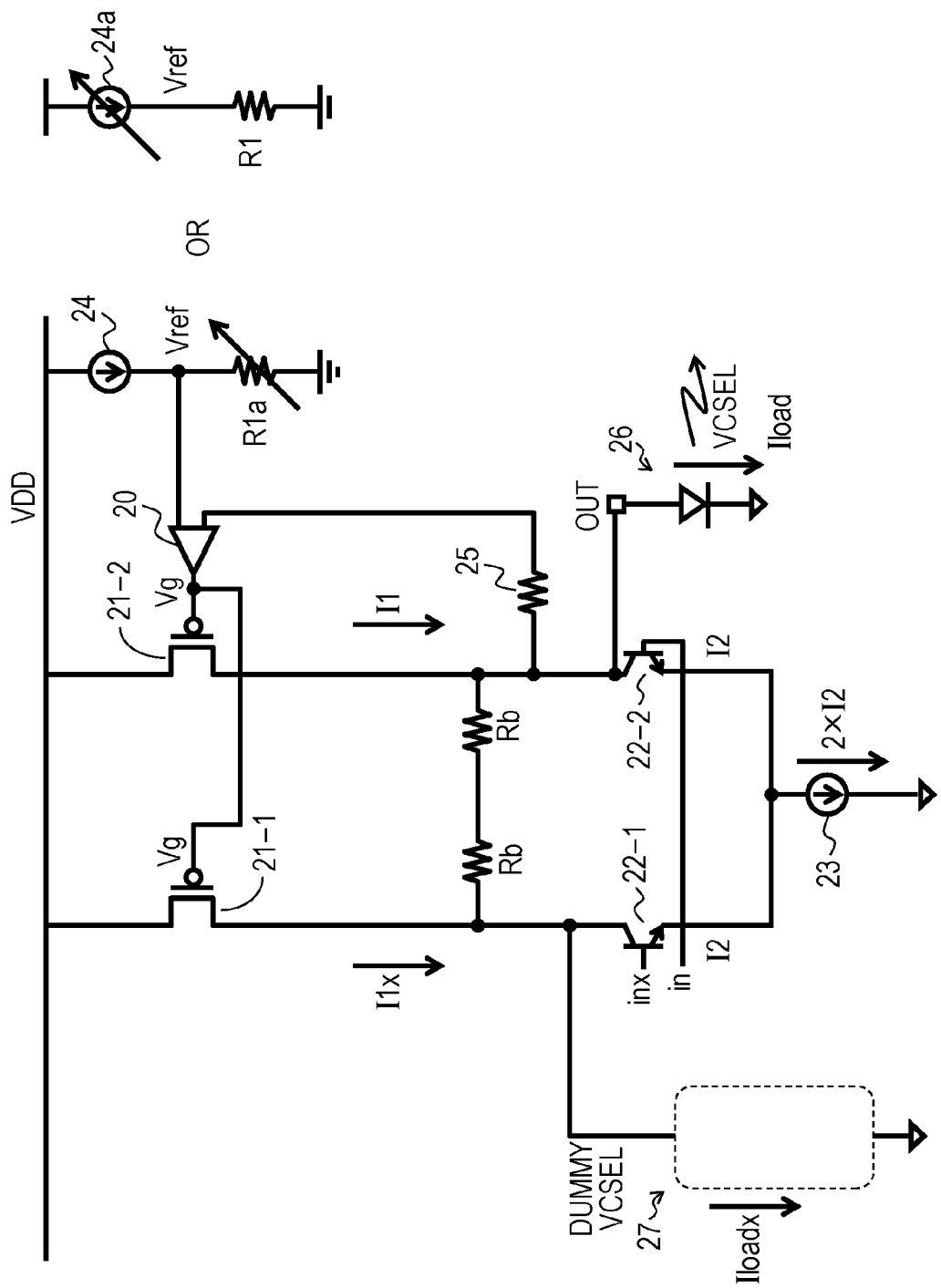
FIG. 14 is a diagram for explaining a sixth embodiment.

FIG. 14 is a diagram for explaining a sixth embodiment. In FIG. 14, the same constituent elements as in FIG. 4 are assigned the same reference numerals and thus descriptions thereof are omitted.

When the voltage Vref is set when assembling the circuit, any control thereafter is not possible in the first to fifth embodiments. Specifically, the current Iload flowing to the VCSEL 26 is determined when the circuit is assembled and no further adjustments are possible.

Conversely, in the sixth embodiment, the reference voltage Vref is made variable even after circuit assembly by making the resistor R1 a variable resistor R1a or by making the current source 24 a variable current source 24a. When the reference voltage Vref is allowed to be variable, the current Iload flowing to the VCSEL 26 may also be varied. For example, when the value of the current Iload is desirably adjusted due to changes to the VCSEL 26 over time, the current Iload may be adjusted by varying the reference voltage Vref.

Figure 15:
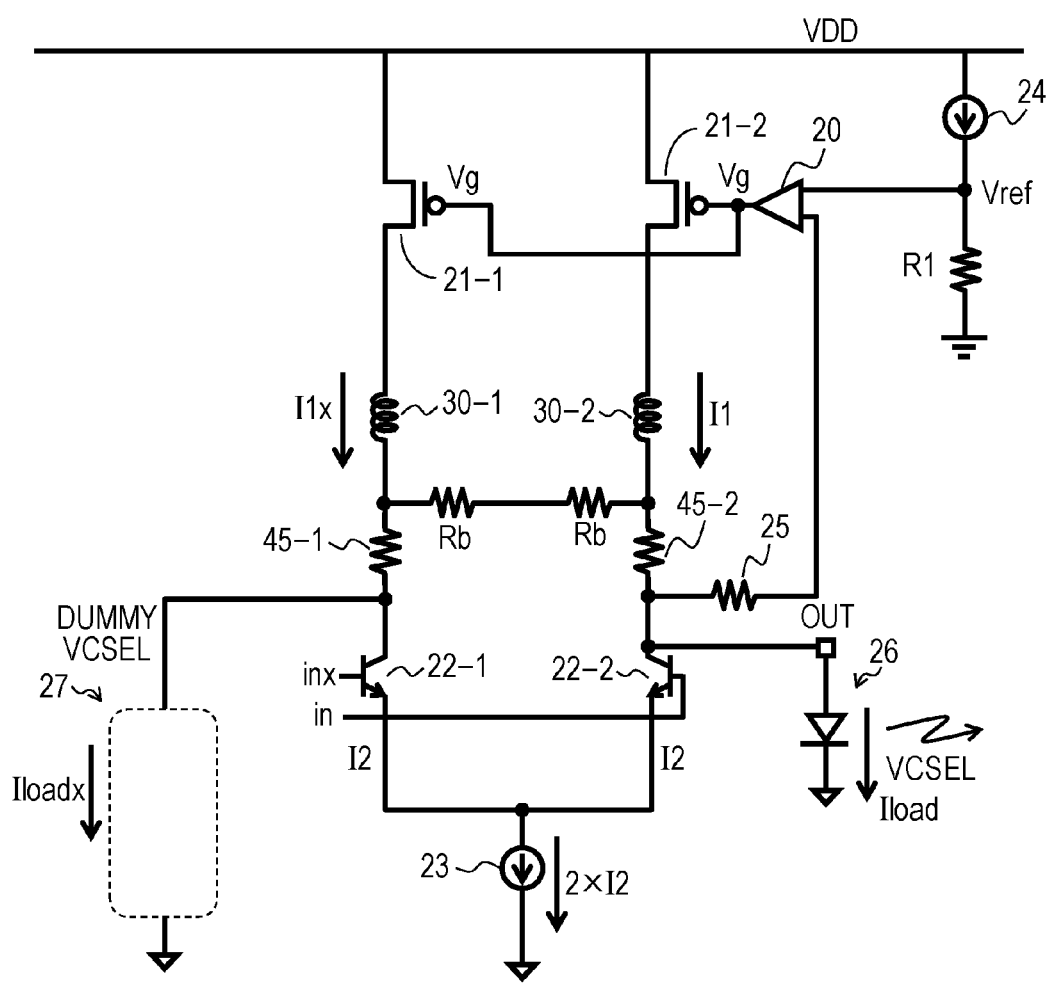
FIG. 15 is a diagram for explaining a seventh embodiment.

FIG. 15 is a diagram for explaining a seventh embodiment. In FIG. 15, the same constituent elements as in FIG. 6 are assigned the same reference numerals and thus descriptions thereof are omitted.

Resistors 45-1 and 45-2 are provided in FIG. 15 for adjusting the output impedance. While the output impedance of the frequency component may be adjusted with the inductors 30-1 and 30-2 and the resistor Rb, the output impedance of the direct current component may also be adjusted due to the provision of the resistors 45-1 and 45-2.

Due to the above embodiment, the parasitic capacitance of the transistors connected to output terminals may be reduced and bandwidth deterioration may be mitigated.

Figure 16:
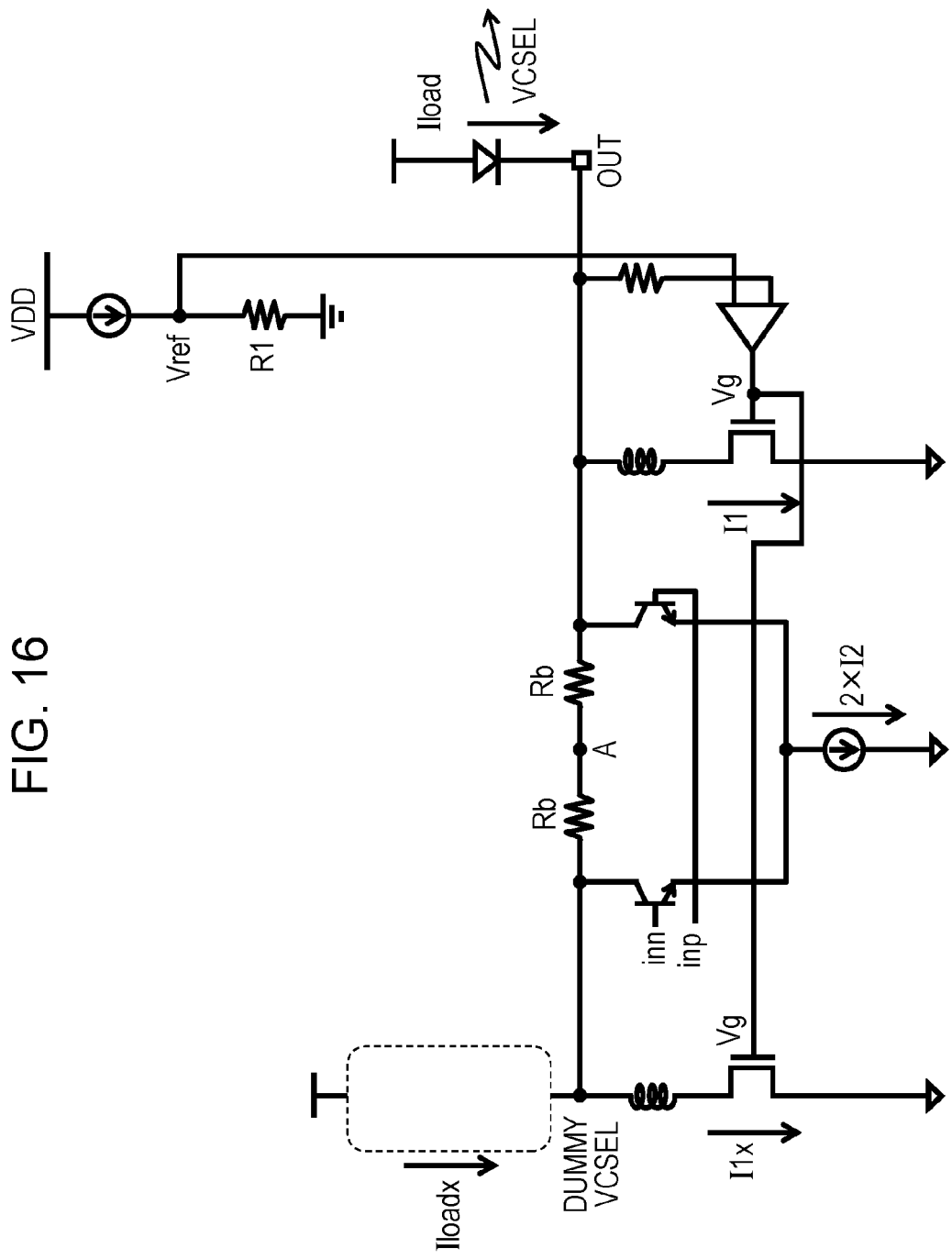
FIG. 16 is a diagram for explaining an eighth embodiment.

FIG. 16 is a diagram for explaining an eighth embodiment. In FIG. 16, the same constituent elements as in FIG. 6 are assigned the same reference numerals and thus descriptions thereof are omitted.

A circuit configuration when using a cathode drive to drive the VCSEL is illustrated in FIG. 16.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A drive circuit that drives a laser diode coupled to a first output terminal of a differential circuit, the drive circuit comprising:
    a dummy load provided at a second output terminal of the differential circuit;
    a first resistor coupled between the first output terminal and the second output terminal;
    two transistors coupled to a voltage source and to the first and second output terminals of the differential circuit, and the two transistors configured to apply a current to the laser diode and the dummy load; and
    an operational amplifier having a non-inverting input terminal coupled to a reference voltage, an inverting input terminal coupled to at least the first output terminal of the differential circuit via a second resistor, and an output terminal coupled to gates of the two transistors.

2. The drive circuit according to claim 1, further comprising inductors between drains of the two transistors and the first and second output terminals, respectively.

3. The drive circuit according to claim 1, wherein
    the first resistor is a variable resistor; and
    the drive circuit further comprises a variable resistor control unit to adjust a value of the variable resistor based on a value of the reference voltage coupled to the non-inverting input terminal of the operational amplifier.

4. The drive circuit according to claim 1, wherein the reference voltage is variable.

5. The drive circuit according to claim 2, further comprising
    third and fourth resistors respectively provided between the inductors and the first and second output terminals.

6. The drive circuit according to claim 1, wherein the laser diode is a vertical cavity surface emitting laser.

7. A drive circuit that drives a laser diode coupled to a first output terminal of a differential circuit, the drive circuit comprising;

a dummy load provided at a second output terminal of the differential circuit;

a resistor couple between the first output terminal and the second output terminal of the differential circuit;

a first transistor coupled to a voltage source and the first output terminal of the differential circuit, and the first transistor configured to apply a current to the laser diode;

a second transistor coupled to the voltage source and the second output terminal of the differential circuit, the second transistor configured to apply a current to the dummy load;

a first operational amplifier having a non-inverting input terminal coupled to a first reference voltage, an inverting input terminal coupled to the first output terminal of the differential circuit, and an output terminal coupled to a gate of the first transistor; and a second operational amplifier having a non-inverting input terminal coupled to a second reference voltage, an inverting input terminal coupled to the second output terminal of the differential circuit, and an output terminal coupled to the gate of the second transistor, the first and second reference voltages being different.

8. The drive circuit according to claim 7, further comprising:

a second resistor configured to detect a current flowing to the laser diode; and a predetermined gain amplifier configured to supply a value multiplied by a constant to both terminals of the second resistor.

9. A drive circuit that drives a laser diode, comprising:

a differential circuit having a first output terminal coupled to the laser diode and having a second output terminal coupled to a dummy load;

first and second transistors, coupled to the first output terminal and the second output terminal, respectively, and configured to apply a current to the laser diode and the dummy load, respectively; and an operational amplifier having a first input terminal coupled to a reference voltage, a second input terminal coupled to the first output terminal of the differential circuit, and an output terminal coupled to gates of the first and second transistors.

\* \* \* \* \*